(12) United States Patent
Asano et al.

(10) Patent No.: US 6,197,862 B1
(45) Date of Patent: Mar. 6, 2001

(54) FILLED POLYTETRAFLUOROETHYLENE GRANULAR POWDER AND PROCESS FOR THE PRODUCTION THEREOF

(75) Inventors: Michio Asano; Masamichi Sukegawa; Hirokazu Yukawa; Tetsuo Shimizu; Shoji Kawachi; Shingo Tanigawa, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/029,857

(22) PCT Filed: Sep. 11, 1996

(86) PCT No.: PCT/JP96/02595

§ 371 Date: Mar. 16, 1998

§ 102(e) Date: Mar. 16, 1998

(87) PCT Pub. No.: WO97/11111

PCT Pub. Date: Mar. 27, 1997

(30) Foreign Application Priority Data

Sep. 18, 1995 (JP) .................................................... 7-264818

(51) Int. Cl.$^7$ ...................................................... C08K 3/00
(52) U.S. Cl. ........................ 524/404; 524/439; 524/440; 524/492; 524/493; 524/494; 524/495; 524/496; 524/449
(58) Field of Search .................................. 524/404, 439, 524/440, 492, 493, 494, 495, 496, 449

(56) References Cited

U.S. PATENT DOCUMENTS

| 3,915,916 | * | 10/1975 | Leverett | ............................ | 260/29.6 |
| 3,929,721 | * | 12/1975 | Leverett | ............................ | 260/42.15 |
| 5,189,143 | * | 2/1993 | Honda et al. | ......................... | 528/498 |
| 5,306,739 | * | 4/1994 | Lucey | ....................................... | 522/42 |

FOREIGN PATENT DOCUMENTS

| 0344689 | 12/1989 | (EP) . |
| 1173000 | 12/1969 | (GB) . |
| 45-9072 | 4/1970 | (JP) . |
| 52-28552 | 3/1977 | (JP) . |
| 52-38565 | 3/1977 | (JP) . |
| 54-17782 | 7/1979 | (JP) . |
| 56-115326 | 9/1981 | (JP) . |
| 60-21694 | 5/1985 | (JP) . |
| 63-159438 | 7/1988 | (JP) . |
| 3-255133 | 11/1991 | (JP) . |
| 4-13729 | 1/1992 | (JP) . |
| 8-208929 | 8/1996 | (JP) . |
| WO 93/16126 | 8/1993 | (WO) . |

OTHER PUBLICATIONS

Chereshkevich at al., "Filled Poly(tetrafluoroethylene)", Chemical Abstracts, vol. 70, No. 6, Abstract No. 2097768, Feb. 10, 1969, Columbus, Ohio.

* cited by examiner

Primary Examiner—Edward J. Cain
(74) Attorney, Agent, or Firm—Armstrong, Westerman, Hattori, McLeland & Naughton

(57) ABSTRACT

Filler-containing polytetrafluoroethylene granular powder, which has a large apparent density, a small average particle size and a sharp particle size distribution and a superior powder flowability, and gives a molded product having a superior tensile strength, elongation and surface roughness, and a process for preparing the same. The granular powder is prepared by granulation of a mixture of a PTFE powder and a filler in water with stirring in the presence of an organic liquid forming liquid-liquid interface with water and a nonionic surfactant.

20 Claims, 6 Drawing Sheets

FILLED POLYTETRAFLUOROETHYLENE GRANULAR POWDER AND PROCESS FOR THE PRODUCTION THEREOF

TECHNICAL FIELD

The present invention relates to a filler-containing polytetrafluoroethylene granular powder and a preparation process thereof.

BACKGROUND ART

Hitherto, a process for preparing a filler-containing polytetrafluoroethylene (PTFE) granular powder by granulating a mixture of a filler and a PTFE powder with stirring in water was proposed, for example, in JP-B-8611/1968, JP-B-22619/1969, JP-B-37576/1973, JP-B-17855/1974, JP-B-8044/1981, JP-B-18730/1982, etc.

However, by the process for preparation disclosed in each of the above-mentioned patent publications, a filler-containing PTFE granular powder having a small particle size and a sharp particle size distribution could not be obtained.

For that reason, in case of preparing, for example, small articles such as seal rings in the form of a rubber band, thin moldings and molded products having a small surface roughness, there was a problem such that complicated and uneconomical steps must be employed, such as step of sieving a filler-containing PTFE granular powder to take out only particles of small size and molding them, or step of cutting the obtained molding.

Also a granular powder having excellent powder flowability cannot be obtained by only pulverizing a filler-containing PTFE granular powder.

In JP-B-21694/1985, there was proposed a process for preparing a filler-containing PTFE granular powder by granulating, with stirring in water, a PTFE powder and a filler which has been previously surface-treated with an aminosilane compound in coexistence with a water-insoluble organic liquid and an anionic surfactant. However, an apparent density of the filler-containing PTFE granular powder and tensile strength of molded products obtained therefrom are not fully satisfactory.

The present inventors have made intensive studies in view of the above-mentioned problems, and as a result, have found that those problems can be solved by granulating a mixture of a PTFE powder and a filler in the presence of an organic liquid which forms liquid-liquid interface with water, and a nonionic surfactant with stirring in water.

Namely, an object of the present invention is to provide a filler-containing PTFE granular powder having a good processability and a process for preparation thereof. Particularly an object of the present invention is to provide a filler-containing PTFE granular powder having a large apparent density, a small average particle size, a sharp particle size distribution and good physical properties such as powder flowability, which gives molded products having excellent physical properties such as elongation and surface smoothness, and a process for preparation thereof.

DISCLOSURE OF THE INVENTION

The present invention relates to a process for preparing a filler-containing polytetrafluoroethylene (PTFE) granular powder which is characterized in that a mixture of a polytetrafluoroethylene (PTFE) powder and a filler is granulated with stirring in water in the presence of an organic liquid which forms liquid-liquid interface with water, and a nonionic surfactant.

By the above-mentioned process, a filler-containing PTFE granular powder having an apparent density of not less than 0.6 g/cm³ can be obtained.

The present invention also relates to a filler-containing PTFE granular powder, in which when an apparent density (d) is $0.6 \leq d < 0.9$, $0.9 \leq d < 1.0$ and $1.0 \leq d$, an angle of repose is not more than 40 degrees, not more than 38 degrees and not more than 36 degrees, respectively and an average particle size is not more than 500 μm.

BEST MODE FOR CARRYING OUT THE INVENTION

Figure 1:
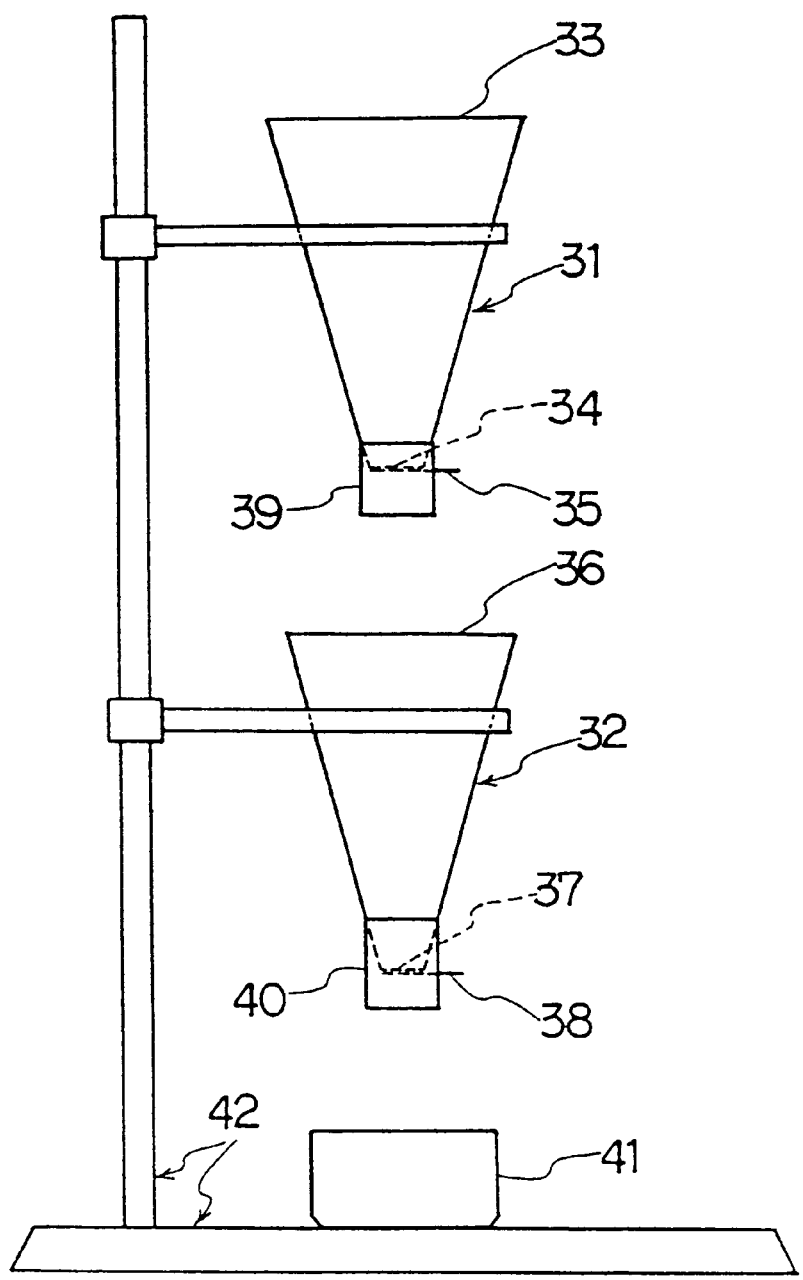
FIG. 1 is a diagrammatic view of an apparatus used for determining flowability of the granular powder in the present invention.

The PTFE powder used in the present invention is prepared by usual suspension polymerization, and preferable is, for example, a powder comprising homopolymer of tetrafluoroethylene (TFE) or a copolymer of TFE and a monomer copolymerizable with TFE. An average particle size after pulverization is not larger than 200 μm, preferably not larger than 50 μm, and a lower limit thereof is defined by a pulverizing apparatus and pulverizing technique.

As the monomer copolymerizable with TFE, there are, for example, a per(fluoro vinyl ether) represented by the formula (I):

$$CF_2=CF-OR_f \qquad (I)$$

wherein $R_f$ is a perfluoroalkyl group having 1 to 10 carbon atoms, a perfluoro(alkoxyalkyl) group having 4 to 9 carbon atoms, an organic group represented by the formula (II):

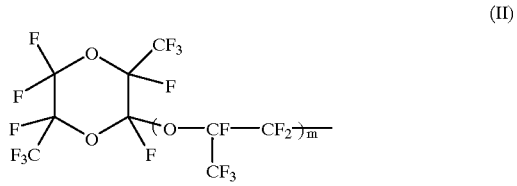

(II)

in which m is 0 or an integer of 1 to 4, or an organic group represented by the formula (III):

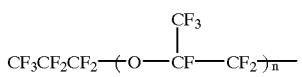

(III)

in which n is an integer of 1 to 4, and the like.

The number of carbon atoms of the above-mentioned perfluoroalkyl group is from 1 to 10, preferably from 1 to 5. When the number of carbon atoms is within the above-mentioned range, an excellent creep resistance can be obtained with maintaining the property of being not-meltprocessable.

As the above-mentioned perfluoroalkyl group, there are, for example, perfluoromethyl, perfluoroethyl, perfluoropropyl, perfluorobutyl, perfluoropentyl, perfluorohexyl and the like. From the viewpoint of creep resistance and cost of monomer, perfluoropropyl is preferable.

When a proportion of the monomer copolymerizable with TFE is within the range of 1.0 to 0.001% by mole, an excellent creep resistance can be obtained.

In the present invention, there are used particles obtained by pulverizing the above-mentioned PTFE powder to an average particle size of not larger than 200 μm, preferably not larger than 50 μm, for example, in the presence of water or under dry condition by means of a pulverizing machine such as hammer mill, crusher equipped with a rotor having blades, pneumatic energy type crusher and impact mill.

The use of those particles having the average particle size in the above-mentioned range gives such effects that the granular powder obtained through granulation is easily handled, that is, having good powder flowability and an excellent apparent density, and in addition, the obtained molded articles have good physical properties.

In the present invention, in case where a hydrophilic filler is used, there is a drawback such that the filler is easily transferred into a liquid phase due to its hydrophilic property and is difficult to be mixed with the PTFE powder homogeneously, that is, the agglomerated powder in which the whole of the filler used is mixed with the PTFE powder cannot be obtained and a part of the filler remains in the treating water. This phenomenon is so-called the separation of filler.

To cope with this problem, there is employed a method of previously surface-treating a hydrophilic filler for making it hydrophobic to lower its surface activity near the surface activity of the PTFE powder and stirring in water, or a method of adding a compound having such a function into an aqueous medium and then stirring.

As the compound known as one used for the above-mentioned surface treatment, there are (a) a functional amino-containing silane, a phenyl-containing silane, and/or a soluble silicone (JP-A-548/1976, JP-A-549/1976, JP-A-218534/1992), (b) a monocarboxylic acid of hydrocarbon having 12 to 20 carbon atoms (JP-B-37576/1973), (c) a chromium complex compound of an aliphatic carboxylic acid (JP-B-37576/1973), (d) a silicone (JP-A-139660/1978), etc. and (e) a method of coating a hydrophilic filler with PTFE (JP-A-121417/1976) is also known.

A filler having water-repelling property can be used as it is.

Examples of the above-mentioned filler are, for instance, one or more of metal fibers or metal powders such as glass fiber, graphite powder, bronze powder, gold powder, silver powder, copper powder, stainless steel powder, stainless steel fiber, nickel powder and nickel fiber; inorganic fibers or inorganic powders such as molybdenum disulfide powder, fluorinated mica powder, coke powder, carbon fiber, boron nitride powder and carbon black; organic powders such as heat-resistant aromatic resin powder, e.g. polyoxybenzoyl polyester, polyimide powder, tetrafluoroethylene-perfluoroalkyl vinyl ether copolymer (PFA) powder and polyphenylene sulfide powder; and the like. The filler is not limited thereto.

In case where two or more fillers are used, preferable combination is, for example, glass fiber and graphite powder, glass fiber and molybdenum disulfide powder, bronze powder and molybdenum disulfide powder, bronze powder and carbon fiber, graphite powder and coke powder, graphite powder and heat-resistant aromatic resin powder, carbon fiber and heat-resistant aromatic resin powder or the like. The mixing method may be either of wet method or dry method.

It is preferable that the above-mentioned filler has an average particle size of 10 to 1,000 μm in case of powder and an average fiber length of 10 to 1,000 μm in case of fiber.

Examples of the above-mentioned compound used for the surface treatement of the hydrophilic filler are, for instance, aminosilane coupling agents such as γ-aminopropyltriethoxysilane ($H_2N(CH_2)_3Si(OC_2H_5)_3$), m- or p-aminophenyltriethoxysilane ($H_2N$—$C_6H_4$—$Si(OC_2H_5)_3$), γ-ureidopropyltriethoxysilane ($H_2NCONH(CH_2)_3Si(OC_2H_5)_3$, N-(β-aminoethyl)-γ-aminopropyltrimethoxysilane ($H_2N(CH_2)_2NH(CH_2)_3Si(OCH_3)_3$) and N-(β-aminoethyl)-γ-aminopropylmethyldimethoxysilane ($H_2N(CH_2)_2NH(CH_2)_3SiCH_3(OCH_3)_2$), and the like. In addition to those compounds, there are, for example, organosilane compounds such as phenyltrimethoxysilane, phenyltriethoxysilane, p-chlorophenyltrimethoxysilane, p-bromomethylphenyltrimethoxysilane, diphenyldimethoxysilane, diphenyldiethoxysilane and diphenylsilanediol.

In order to obtain a mixture of the PTFE powder and the filler, which is used in the present invention, the filler may be mixed homogeneously with the PTFE powder having a particle size of not larger than 200 μm by means of a pulverizing mixer, a flash mixer, a blender or a kneader. It is preferable that the proportion thereof is 2.5 to 100 parts (parts by weight, hereinafter the same) of the filler on the basis of 100 parts of the PTFE powder.

The organic liquid forming liquid-liquid interface with water, which is used in the present invention may be an organic liquid capable of forming a liquid-liquid interface with water and being present as droplets in water or may be one which dissolves somewhat in water if it is capable of forming droplets in water and a liquid-liquid interface with water. Examples thereof are, for instance, alcohols such as 1-butanol and 1-pentanol; ethers such as diethyl ether and dipropyl ether; ketones such as methyl ethyl ketone and 2-pentanone; aliphatic hydrocarbons such as pentane and dodecane; aromatic hydrocarbons such as benzene, toluene and xylene; halogenated hydrocarbons such as methylene chloride, tetrachloroethylene, trichloroethylene, chloroform, chlorobenzene, trichlorotrifluoroethane, monofluorotrichloromethane, difluorotetrachloroethane, 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane and 1,1-dichloro-1-fluoroethane; and the like. Among them, the halogenated hydrocarbons are preferable, and particularly preferable are chlorinated- and fluorochlorinated-hydrocarbons such as 1,1,1-trichloroethane, 1,1-dichloro-2,2,3,3,3-pentafluoropropane, 1,3-dichloro-1,1,2,2,3- pentafluoropropane, 1,1-dichloro-2,2,2-trifluoroethane and 1,1-dichloro-1-fluoroethane. Those are inflammable and satisfy requirements for fleon restrictions. Those organic liquids may be used solely or in a combination use of two or more thereof.

An amount of the above-mentioned liquid-liquid interface-forming organic liquid is 30 to 80% (% by weight, hereinafter the same), preferably 40 to 60% on the basis of the total amount of the PTFE powder and filler.

In the present invention, it appears that the granulation of the PTFE powder and the filler is conducted in the droplets of the above-mentioned liquid-liquid interface-forming organic liquid and that, since the droplets of the liquid become smaller and more approximate to a spherical form because of functioning of a nonionic surfactant, particles having a smaller size and a form near sphere can be obtained, and an apparent density of the granular powder is increased. Examples of the above-mentioned nonionic surfactant are, for instance, polyoxyethylamine oxides, alkylamine oxides, polyoxyethylene alkyl ethers, polyoxyethylene alkyl phenyl ethers, polyoxyethylene fatty acid esters, sorbitan fatty acid esters, polyoxyethylene sorbitan fatty acid esters, glycerine esters, polyoxyethylene alkylamine, the derivatives thereof, and the like.

More particularly, examples of the polyoxyethylamine oxides are dimethyloxyethylamine oxide and the like.

Examples of the alkylamine oxides are dimethyllaurylamine oxide, dimethyloleylamine oxide and the like.

Examples of the polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like.

Examples of the polyoxyethylene alkyl phenyl ethers are polyoxyethylene nonyl phenyl ether, polyoxyethylene octyl phenyl ether and the like.

Examples of the polyoxyethylene fatty acid esters are polyoxyethylene monolauric acid ester, polyoxyethylene monooleic acid ester, polyoxyethylene monostearic acid ester and the like.

Examples of the sorbitan fatty acid esters are sorbitan monolauric acid ester, sorbitan monopalmitic acid ester, sorbitan monostearic acid ester, sorbitan monooleic acid ester and the like.

Examples of the polyoxyethylene sorbitan fatty acid esters are polyoxyethylene sorbitan monolauric acid ester, polyoxyethylene sorbitan monopalmitic acid ester, polyoxyethylene sorbitan monostearic acid ester and the like.

Examples of the glycerine esters are monomyristic acid glyceryl, monostearic acid glyceryl, monooleic acid glyceryl and the like.

Examples of the derivalives of the above surfactants are, for example, polyoxyethylene alkyl phenyl-formaldehyde condensate, polyoxyethylene alkyl ether phosphate and the like.

Among them, preferable are the amine oxides and the polyoxyethylene alkyl phenyl ethers, and more preferable are polyoxyethylene nonyl phenyl ether, polyoxyethylene octyl phenyl ether and polyoxyethylamine oxide.

An amount of the above-mentioned nonionic surfactant is from 0.01 to 5%, preferably from 0.1 to 0.3% on the basis of the total amount of the PTFE powder and filler.

By using the nonionic surfactant in the above-mentioned range, there can be obtained a granular powder being in the spherical form and having a small particle size, a sharp particle size distribution, an excellent powder flowability and a large apparent density.

In the present invention, in addition to the above-mentioned nonionic surfactant, 0.001 to 5% of an anionic surfactant may be added on the basis of the sum of the PTFE powder and the filler. As the anionic surfactant, there can be used known ones, for example, higher fatty acid and its salt, alkyl sulfate, alkyl sulfonate, alkyl aryl sulfonate, alkyl phosphoric acid ester and the like. Particularly preferable anionic surfactants are a sulfate of higher alkyl alcohol, for example, sodium lauryl sulfate or a fluorine-containing sulfonic acid type- or carboxylic acid type-anionic surfactant having a fluoroalkyl group or chlorofluoroalkyl group. The typical compounds thereof are those represented by the formula (IV):

$$X(CF_2CF_2)_n(CH_2)_mA \qquad (IV)$$

or the formula (V):

$$X(CF_2CFCl)_n(CH_2)_mA \qquad (V)$$

wherein X is hydrogen, fluorine atom or chlorine atom, n is an integer of 3 to 10, m is 0 or an integer of 1 to 4, A is carboxyl group, sulfonic acid group or an alkali metal or ammonium residue thereof.

The filler-containing PTFE granular powder of the present invention is prepared, for example, by a method mentioned below, but the method is not limited thereto.

The PTFE powder previously pulverized to a particle size of not larger than 200 $\mu$m is pre-mixed with the filler by using a 75-liter Henschel mixer to give 11 kg of a mixture.

Two kg of the mixture of the PTFE powder and the filler is added in a 10-liter granulation tank containing 5.5 to 6 liters of ion-exchanged water.

To this tank, 450 to 1,500 ml of the liquid-liquid interface-forming organic liquid is added and then 4 to 200 ml of 5% aqueous solution of the nonionic surfactant is added. Then granulation is carried out with cone blade at 23° to 27° C. at a stirring speed of 600 to 900 rpm for 5 to 10 minutes.

Alternative to the above-mentioned timing of the addition, the nonionic surfactant may be added, for example, before the addition of the mixture of the PTFE powder and the filler or before the addition of the liquid-liquid interface-forming organic liquid. From the viewpoint of giving priority to adsorption of the surfactant to the liquid-liquid interface (namely, interface between the organic liquid and water), it is preferable to add the nonionic surfactant in an interval of time between the addition of the liquid-liquid interface-forming organic liquid and the starting of the granulation.

Then, the stirring is carried out with dispersing blade of 100φ at a stirring speed of 1,000 to 2,000 rpm for two minutes. This stirring may be omitted.

In the next step, shaping of granular powder is conducted with cone blade at a temperature of 23° to 27° C. at a stirring speed of 600 to 800 rpm for 0 to 15 minutes.

After that, with continuing the stirring, the inside temperature of the granulation tank is raised up to a temperature in the range of 37.5° to 38.0° C. over 15 to 30 minutes and is kept at that temperature for 0 to 60 minutes. This temperature keeping step is not conducted from the viewpoint of the separation of filler in case where the filler is, for example, glass fiber or a metal fiber or metal powder such as bronze powder, gold powder, silver powder, copper powder, stainless steel powder, stainless steel fiber, nickel powder or nickel fiber.

Then, the stirring is stopped, the granulates are separated from water by using a 150 mesh sieve and the granulates are dried in an electric oven at 120° to 250° C. for 15 to 20 hours to give the filler-containing PTFE granular powder of the present invention.

The preparation process of the present invention can give a filler-containing PTFE granular powder which has physical properties mentioned hereinbelow and provides molded products with physical properties described hereinbelow. Particularly since the particle size distribution is sharp, an additional step, for example, a step of taking out particles of a small size with a sieve like a conventional method, is not necessary. Thus, the filler-containing PTFE granular powder which cannot be prepared by a conventional process can be prepared.

Physical Properties of Filler-containing PTFE Granular Powder

Filler content: 2.5 to 50%

When less than 2.5%, there is a tendency that abrasion resistance and creep resistance are lowered, and when more than 50%, there is a tendency that slipping property inherent to a fluorine-containing resin is lowered and an article contacting the molding prepared from the granular powder is damaged. From the viewpoint of abrasion resistance, creep resistance and slipping property, 5 to 40% is particularly preferable.

Apparent density: not less than 0.6 g/cm$^3$

When less than 0.6 g/cm$^3$, an amount of powder to be filled in a die is small.

Flowability (21B method): not less than 6 times

When not more than 5.5 times, flowability in a hopper is not so good. Particularly 8 times is preferable.

Angle of repose: not more than 40 degrees

The powder having an angle of repose exceeding 42 degrees is not preferable because its flowability is not good. Particularly an angle of repose of not more than 40 degrees is preferable.

The angle of repose is not more than 38 degrees when the apparent density is not less than 0.9 g/cm$^3$ and less than 1.0 g/cm$^3$, and is not more than 36 degrees when the apparent density is more than 1.0 g/cm$^3$.

An angle of repose of a powder is affected by a gravity and becomes smaller as an apparent density becomes higher. Accordingly, the granular powder obtained by the granulation method of the present invention changes its angle of repose depending on its apparent density. The powders of the present invention have smaller angle of repose than that of granular powders obtained by conventional techniques.

The angle of repose of the powders obtained by the conventional techniques is not less than 40 degrees when the apparent density is not less than 0.6 g/cm$^3$ and less than 0.9 g/cm$^3$, not less than 38 degrees when the apparent density is not less than 0.9 g/cm$^3$ and less than 1.0 g/cm$^3$ and not less than 36 degrees when the apparent density is not less than 1.0 g/cm$^3$.

Particle size distribution A:

Granular powder remaining on a 10 mesh sieve: 0%

Granular powder remaining on a 20 mesh sieve: not more than 5%

The granular powder having the particle size distribution mentioned above after granulated is preferable since it is filled uniformly in the die because the particle size is uniform. It is particularly preferable that the granular powder remaining on the 10 mesh and 20 mesh sieves is 0%.

Particle size distribution B: not less than 50% by weight

The granular powder having the particle size distribution mentioned above after granulated is preferable because it is filled uniformly in the die. Particularly not less than 60% by weight is preferable.

Average particle size: not more than 500 μm

When larger than 500 μm, the powder cannot be filled in the thin-walled die. Particularly preferable is from 150 to 400 μm from the viewpoint of filling the powder in the thin-walled die.

Physical Properties of Molded Article

Tensile strength: not less than 100 kgf/cm$^2$

When less than 100 kgf/cm$^2$, the molded article is inferior in mechanical strength. Preferable tensile strength is not less than 150 kgf/cm$^2$ and the tensile strength is determined in that range depending on its application.

Elongation: 100 to 400%

When less than 100%, there is a case where the molded article is cut when mounted on an equipment or processed. Preferable elongation is not less than 150%.

Surface roughness: not larger than 3.0 μm

The molded article having a surface roughness larger than 3.0 μm is not preferable because that roughness is larger than desired. Particularly preferable surface roughness is not larger than 2.0 μm.

The methods of measuring each physical property are described hereinbelow.

Apparent density: Measured in accordance with JIS K 6891-5.3

Average Particle size after pulverization (Primary particle size):

Wet sieve method: JIS standard sieves of 20 mesh (sieve opening: 840 μm), 250 mesh (sieve opening: 62 μm), 270 mesh (sieve opening: 53 μm), 325 mesh (sieve opening: 44 μm) and 400 mesh (sieve opening: 37 μm) are used. First, the 20 mesh sieve is placed on the 250 mesh sieve, and 5 g of a sample powder is put on the 20 mesh sieve. By spraying carbon tetrachloride carefully with a sprayer at a rate of about 3 liters/m$^2$ for about 30 seconds, the powder is rinsed on the lower sieve. When the sample powder has been rinsed completely, the upper sieve is removed and spraying all over the lower sieve is conducted for about four minutes. After that, the lower sieve is air-dried and a weight of the dried powder remaining thereon is measured. A series of the above-mentioned steps are repeated by using the 20 mesh sieve and each of the other three sieves of smaller meshes, respectively, and 5 g each of new sample powder is used. In order to obtain an accumulated weight percentage, the weights of the powder remaining on each sieve are multiplied by 20 and then those obtained values are plotted on a logarithmic probability paper to openings of each sieve. Those plotted points are connected with a line, particle sizes corresponding to the accumulated percentages 50($d_{50}$) and 84($d_{34}$) are read, and wet sieve size ($d_{WS}$) is calculated by the following equation.

$$\log_e d_{ws} = \log_e d_{50} - \frac{1}{2}\left(\log_e \frac{d_{34}}{d_{50}}\right)^2$$

Flowability (called 21B method): Measured in accordance with the method described in JP-A-259925/1991.

Figure 3:
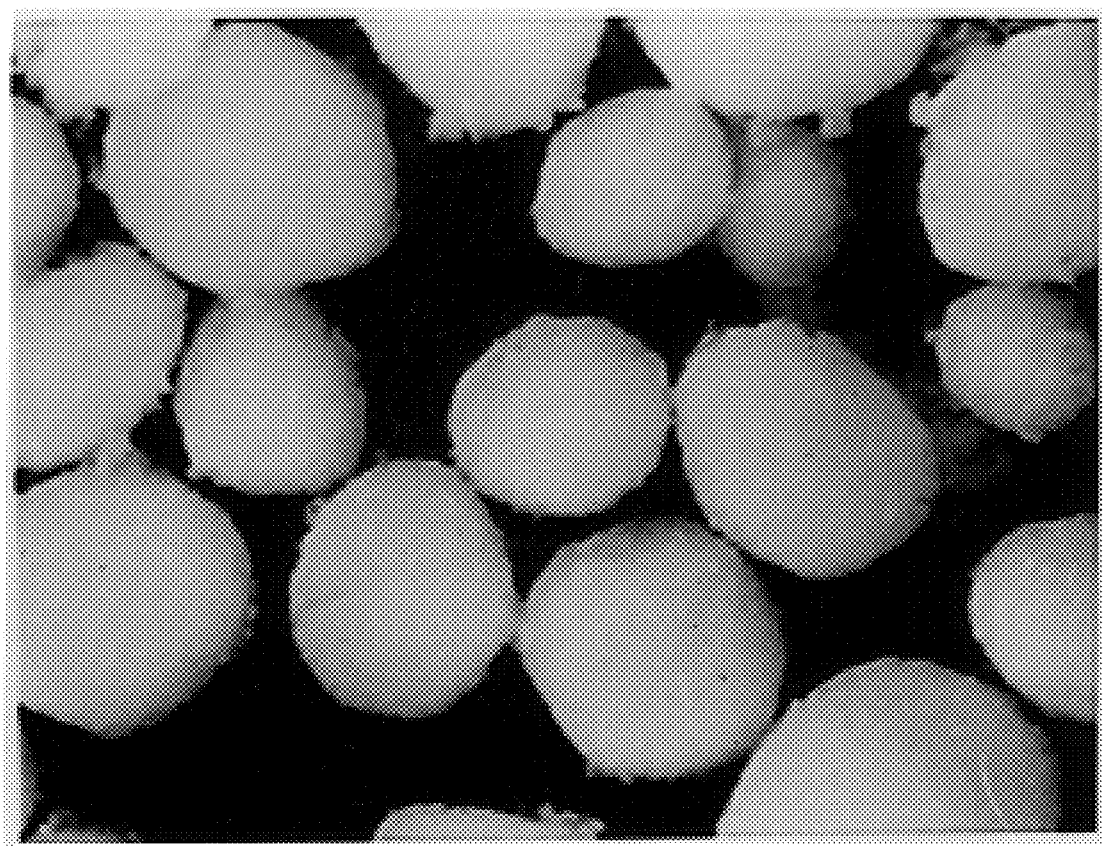
FIG. 3 is an optical microscopic photograph (magnification: x100) showing a structure of particles in the filler-containing PTFE granular powder of the present invention, which was obtained in Example 2.

Namely, there is used a measuring device comprising a support base 42 and an upper hopper 31 and a lower hopper 32, the both of which are aligned on their center lines and supported on the support base 42 as shown in FIG. 1 (corresponding to FIG. 3 described in JP-A-259925/1991). The upper hopper 31 has an inlet 33 of 74 mm diameter, an outlet 34 of 12 mm diameter and a partition plate 35. The height from the inlet 33 to the outlet 34 is 123 mm. The partition plate 35 is provided on the outlet 34, and thereby the powder in the hopper can be kept therein and dropped optionally. The lower hopper 32 has an inlet 36 of 76 mm diameter, an outlet 37 of 12 mm diameter and a partition plate 38. The height from the inlet 36 to the outlet 37 is 120 mm, and the partition plate 38 is provided on the outlet 37 like the upper hopper. The upper hopper and the lower hopper are adjusted so that the distance between the both partition plates is 15 cm. In FIG. 1, the numerals 39 and 40 indicate outlet covers of each hopper, and the numeral 41 indicates a vessel for receiving the dropped powder.

Prior to measuring the flowability, about 200 g of powder is allowed to stand for not less than four hours in a room, the temperature of which is adjusted to 23.5° to 24.5° C., and then sieved with a 10 mesh sieve (sieve opening: 1,680 μm). The measurement of the flowability is carried out at the same temperature.

(I) At first, immediately after the upper hopper 31 is charged with just a cup of powder by using a 30 cc cup, the partition plate 35 is pulled out to drop the powder into the lower hopper. When the powder does not drop, the powder is stuck with a wire. After the powder has dropped completely into the lower hopper 32, the dropped powder is allowed to stand for 15±2 seconds, and then the partition plate 38 of the lower hopper is pulled out to see whether the powder is dropped or not from the outlet 37. When the powder is dropped completely within eight seconds, the powder is estimated to have been dropped as required.

(II) The same steps as above are repeated three times to see if the powder is dropped as required. In case where the powder is dropped satisfactorily twice or more, the flowability of the powder is estimated to be "Good." In case where the powder is never dropped, the flowability of the powder is estimated to be "Not good." In case where in three series of the dropping test, the powder has been dropped only one time, the dropping test is further conducted twice, and when the two series of the dropping test are both satisfactory, the flowability is estimated to be "Good." In other cases, the flowability is estimated to be "Not good."

(III) With respect to the powder estimated to be "Good," the upper hopper is charged with two cups of powder by using the same 30 cc cup, and the dropping test of the powder is conducted in the same manner as above. When as a result, the flowability is estimated to be "Good," the number of cups filled with the powder is increased successively and the dropping test is continued until the flowability is estimated to be "Not good." The dropping test is conducted up to eight cups at most. The powder having flowed out from the lower hopper in the previous dropping test may be re-used.

(IV) The larger the amount of the PTFE powder is, the more difficult to drop.

The number of cups when the flowability is estimated to be "Not good" is subtracted by 1, and the obtained value is taken as "Flowability" of the powder.

Average particle size and particle size distribution A of granular powder:

Standard sieves of 10, 20, 32, 48, 60 and 83 meshes (inch mesh) are placed in that order from the top, and PTFE granular powder is put on the 10 mesh sieve. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size. Also percents by weight of the granular powder remaining on each sieve of 10, 20, 32, 48, 60 and 83 meshes are regarded as the particle size distribution A.

Particle size distribution B:

The particle size distribution B is a proportion in weight of the particles having a diameter 0.7 to 1.3 times the average particle size on the basis of the whole particles, and is calculated by multiplying the average particle size by 0.7 or 1.3. The obtained values are plotted on the accumulated weight percentage curve, and thus the weight percentage is obtained.

Tensile strength (hereinafter may be referred to as "TS") and elongation (hereinafter may be referred to as "EL"):

A die having an inner diameter of 100 mm is charged with 25 g of powder, and a pressure is applied gradually over about 30 seconds until the final pressure becomes about 500 kg/cm². Then that pressure is kept for two minutes to give a pre-molded article. The pre-molded article is taken out of the die mold and put in an electric oven being kept at 365° C. to be subjected to sintering for three hours. Then the sintered article is punched with a JIS dumbbell No. 3 to give a sample. A stress at break and elongation of the sample are measured in accordance with JIS K 6891-58 by stretching at a stretching rate of 200 mm/min with an autograph having a gross weight of 500 kg.

Angle of repose:

Measured with Powder Tester available from Hosokawa Micron Co., Ltd.

Surface roughness:

A 50 mm diameter die mold was charged with 210 g of powders and maintained for five minutes at a molding pressure of 500 kg/cm². The obtained pre-molded article was heated up from room temperature to 365° C. at a heating rate of 50° C./hr. After maintained at 365° C. for 5.5 hours, the pre-molded article was cooled at a cooling rate of 50° C./hr. The top surface of the obtained molded article is measured according to the center line average roughness ($R_a$) method described in JIS B 0601 by using a surface roughness measuring device available from Tokyo Seimitsu Kikai Kabushiki Kaisha.

The preferred proportion of each component for preparing the filler-containing PTFE granular powder of the present invention is, for example, as follows:

| | |
|---|---|
| PTFE powder | 100 parts |
| Filler | 2.5 to 100 parts |
| Nonionic surfactant | 0.01 to 5% by |
| (on the basis of the sum of | weight |
| the PTFE powder and filler) | |
| Liquid-liquid interface-forming | 30 to 80 parts |
| organic liquid | |

The filler-containing PTFE granular powder prepared from those components in the proportion mentioned above is advantageous from viewpoints of a large apparent density, a small angle of repose and good flowability. More preferable are the components mentioned below.

| | |
|---|---|
| PTFE powder | 100 parts |
| Filler | 5 to 80 parts |
| Amine oxide type nonionic surfactant | 0.1 to 0.3% by |
| (on the basis of the sum of | weight |
| the PTFE powder and filler) | |
| Liquid-liquid interface-forming | 40 to 60 parts |
| organic liquid | |

The filler-containing PTFE granular powder prepared from those components in the proportion mentioned above is advantageous from viewpoints of a small particle size and a sharp particle size distribution and from such a point that a surface roughness of a molded article obtained from the granular powder is small.

The present invention is then explained by means of Examples, but is not limited thereto.

EXAMPLE 1

First, 9.35 kg (dry basis) of a pulverized PTFE powder (POLYFLON M-111 available from Daikin Industries, Ltd., modified PTFE which 0.1% by mole of perfluoropropyl vinyl ether is copolymerized with) having an average particle size of 25 μm and 1.65 kg of glass fibers (average diameter: 12 μm, average fiber length: 80 μm) which were subjected to water-repellent-treatment with an aminosilane coupling agent previously were pre-mixed by using a 75-liter Henschel mixer.

A 10-liter granulation tank was charged with 6 liters of ion-exchanged water and further 2 kg of the mixture of the PTFE powder and the glass fibers obtained by the above-mentioned pre-mixing.

Then, 40 ml of 5% by weight aqueous solution of the amine oxide type nonionic surfactant (dimethyloxyethylamine oxide) was added in a concentration (concentration to the total amount of the PTFE powder and filler) shown in Table 1, and then 1,200 ml of a liquid-liquid interface-forming organic liquid (methylene chloride) was added. And, granulation was carried out at 25° C.±2° C. for five minutes under stirring at 800 rpm by using cone blade.

The stirring was continued for 2 minutes at 2,000 rpm by using dispersing blade of 100φ.

The granulation was further carried out, for shaping of the granular powder, at 25° C.±2° C. for ten minutes under stirring at 800 rpm by using cone blade.

Subsequently, the stirring was stopped after the temperature in the tank was raised up to 38° C. over 20 minutes. The granulates obtained by using a 150 mesh sieve was dried in an electric oven at 165° C. for 16 hours to obtain a filler-containing PTFE granular powder of the present invention, and the physical properties thereof were determined.

The results are shown in Table 1.

EXAMPLES 2 AND 3

The same procedures as in Example 1 were repeated except that there were employed the pulverized PTFE powder (POLYFLON M-12 available from Daikin Industries, Ltd., PTFE homopolymer) having an average particle size of 31 μm and the amounts shown in Table 1 of the nonionic surfactant and the liquid-liquid interface-forming organic liquid, to give a filler-containing PTFE granular powder of the present invention. The same tests as in Example 1 were carried out, and the results thereof are shown in Table 1.

Also, with respect to the filler-containing PTFE granular powder obtained in Example 2, the photographs of the particles in the powder were taken in the following way. Shape of particle: By using a Video Microscope of optical microscope available from SONY Corporation, photographs were taken at 100 magnifications and 200 magnifications.

Figure 2:
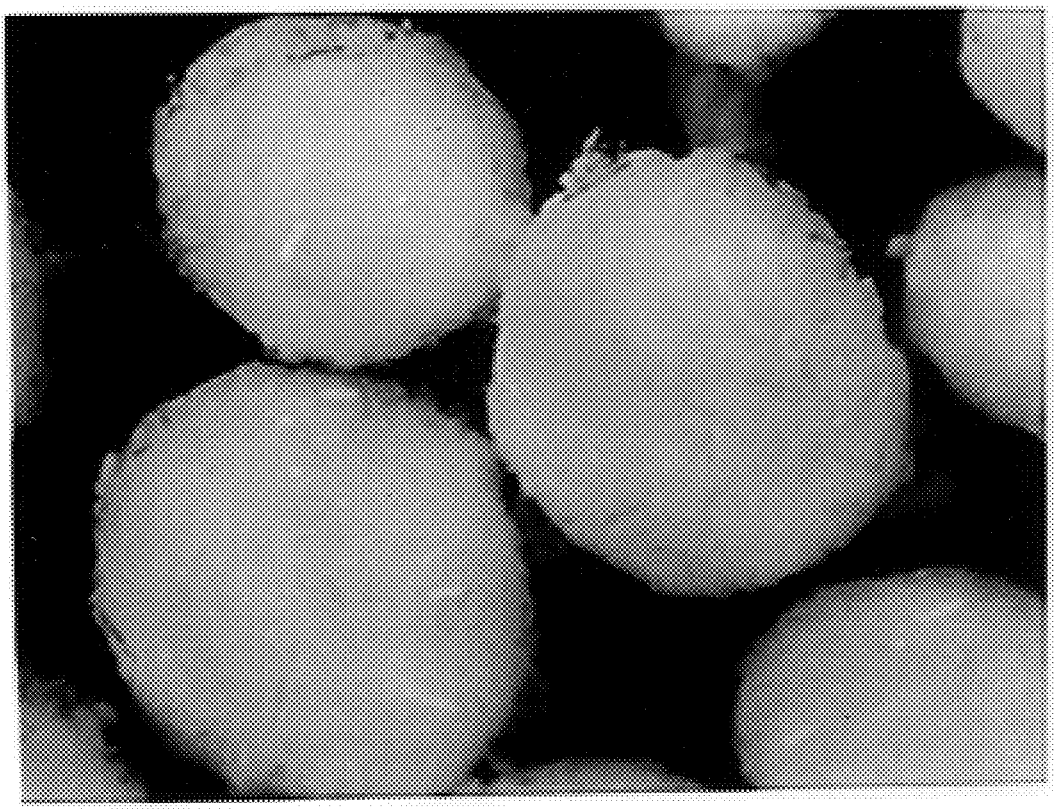
FIG. 2 is an optical microscopic photograph (magnification: x200) showing a structure of particles in the filler-containing PTFE granular powder of the present invention, which was obtained in Example 2.

The results are shown in FIGS. 2 and 3.

EXAMPLE 4

First, 9.9 kg (dry basis) of a pulverized PTFE powder (POLYFLON M-111 available from Daikin Industries, Ltd., modified PTFE which 0.1% by mole of perfluoropropyl vinyl ether is copolymerized with) having an average particle size of 25 μm and 1.1 kg of carbon fibers (pitch-type carbon fiber SG-249 available from Osaka Gas Chemical Kabushiki Kaisha, average diameter: 12 μm, average fiber length: 110 μm) were pre-mixed by using a 75-liter Henschel mixer.

A 10-liter granulation tank was charged with 6 liters of ion-exchanged water and further 2 kg of the mixture of the PTFE powder and the carbon fibers obtained by the above-mentioned pre-mixing.

Then, 40 ml of 5% by weight aqueous solution of the amine oxide type nonionic surfactant (dimethyloxyethylamine oxide) was added in a concentration (concentration to the total amount of the PTFE powder and filler) shown in Table 1, and then 1,200 ml of a liquid-liquid interface-forming organic liquid (methylene chloride) was added. And, granulation was carried out at 25° C.±2° C. for 5 minutes under stirring at 800 rpm by using cone blade.

The stirring was continued for 2 minutes at 2,000 rpm by using dispersing blade of 100φ.

Then granulation was further carried out, for shaping of the granular powder, at 25°±2° C. for ten minutes under stirring at 800 rpm.

Subsequently, the temperature in the tank was raised up to 38° C. over 20 minutes, and the stirring was stopped after the tank was kept at this temperature for 10 minutes. The granulates obtained by using a 150 mesh sieve was dried in an electric oven at 165° C. for 16 hours to obtain a filler-containing PTFE granular powder of the present invention. The same tests as in Example 1 were carried out, and the results thereof are shown in Table 1.

EXAMPLE 5

The same procedures as in Example 4 were repeated except that there were employed the pulverized PTFE powder (POLYFLON M-12 available from Daikin Industries, Ltd.) having an average particle size of 31 μm and the amounts shown in Table 1 of the nonionic surfactant and the liquid-liquid interface-forming organic liquid, to give a filler-containing PTFE granular powder of the present invention. The same tests as in Example 1 were carried out, and the results thereof are shown in Table 1.

EXAMPLE 6

The same procedures as in Example 4 were repeated except that there were employed the amounts shown in Table 1 of the nonionic surfactant and the liquid-liquid interface-forming organic liquid, to give a filler-containing PTFE granular powder of the present invention. The same tests as in Example 1 were carried out and a photograph was taken in the same manner as in Example 2. The results are shown in Table 1 and FIG. 4.

COMPARATIVE EXAMPLE 1

The same procedures as in Example 2 were repeated except that there was not employed the nonionic surfactant, to give a filler-containing PTFE granular powder. The same tests as in Example 1 were carried out and a photograph was taken in the same manner as in Example 2. The results are shown in Table 1 and FIG. 5.

COMPARATIVE EXAMPLE 2

The same procedures as in Example 4 were repeated except that there was not employed the nonionic surfactant, to give a filler-containing PTFE granular powder. The same tests as in Example 1 were carried out and a photograph was taken in the same manner as in Example 2. The results are shown in Table 1 and FIG. 6.

TABLE 1

|  | Ex.1 | Ex.2 | Ex.3 | Ex.4 | Ex.5 | Ex.6 | Com.Ex.1 | Com.Ex.2 |
|---|---|---|---|---|---|---|---|---|
| Conditions of preparation |  |  |  |  |  |  |  |  |
| PTFE powder | M-111 | M-12 | M-12 | M-111 | M-12 | M-111 | M-12 | M-111 |
| Average particle size after pulverization ($\mu$m) | 25 | 31 | 31 | 25 | 31 | 25 | 31 | 25 |
| Filler | Glass fiber | Glass fiber | Glass fiber | Carbon fiber | Carbon fiber | Carbon fiber | Glass fiber | Carbon fiber |
| Nonionic surfactant (% by weight) | 0.1 | 0.3 | 0.5 | 0.1 | 0.3 | 0.5 | — | — |
| Liquid-liquid interface-forming organic liquid (ml) | 1200 | 1100 | 1100 | 1200 | 1100 | 1100 | 1100 | 1100 |
| Physical properties of granular powder |  |  |  |  |  |  |  |  |
| Apparent density (g/cm$^3$) | 0.82 | 0.78 | 0.72 | 0.77 | 0.75 | 0.72 | 0.73 | 0.68 |
| Flowability (21B method: times) | 8.0 | 8.0 | 8.0 | 8.0 | 8.0 | 8.0 | 5.5 | 4.0 |
| Angle of repose (degree) | 36 | 38 | 36 | 38 | 35 | 33 | 42 | 43 |
| Particle size distribution A (% by weight) |  |  |  |  |  |  |  |  |
| 10 on | 0.0 | 0.0 | 0.0 | 0.0 | 0.0 | 0.0 | 1.0 | 0.0 |
| 20 on | 5.2 | 0.0 | 0.0 | 0.0 | 0.0 | 0.0 | 28.2 | 19.9 |
| 32 on | 45.4 | 2.6 | 4.4 | 50.0 | 3.0 | 0.4 | 35.4 | 60.0 |
| 48 on | 42.8 | 68.2 | 39.4 | 48.2 | 68.6 | 28.4 | 28.2 | 19.4 |
| 60 on | 4.4 | 19.8 | 22.8 | 1.6 | 19.2 | 25.0 | 7.5 | 0.5 |
| 83 on | 2.2 | 7.4 | 19.6 | 0.2 | 7.2 | 21.8 | 0.0 | 0.2 |
| 83 pass | 0.0 | 2.2 | 13.8 | 0.0 | 2.0 | 24.6 | 0.0 | 0.0 |
| Particle size distribution B (% by weight) | 51.8 | 76.3 | 50.6 | 57.7 | 76.2 | 51.0 | 41.6 | 63.7 |
| Average particle size after granulation ($\mu$m) | 500 | 330 | 280 | 500 | 360 | 260 | 690 | 670 |
| Physical properties of molded article |  |  |  |  |  |  |  |  |
| TS (kg/cm$^2$G) | 208 | 220 | 207 | 207 | 253 | 202 | 218 | 199 |
| EL (%) | 280 | 285 | 283 | 270 | 279 | 270 | 280 | 260 |
| Surface roughness ($\mu$m) | 2.78 | 2.39 | 2.09 | 2.48 | 1.85 | 1.35 | 3.24 | 3.10 |

In the column of the particle size distribution A of Table 1, 10 on, 20 on, 32 on, 48 on, 60 on and 83 on indicate the percentages of particles remaining on the 10 mesh, 20 mesh, 32 mesh, 48 mesh, 60 mesh and 83 mesh sieves, respectively. And, 83 pass represents the percentage of the particles passed through the 83 mesh sieve.

As is evident from the results in Table 1, the filler-containing PTFE granular powder obtained by the preparation process of the present invention has a large apparent density, particularly a small particle size and a sharp particle size distribution and a superior flowability in spite of the small particle size. Also, the molded article obtained from the granular powder is superior in tensile strength and elongation and the surface roughness thereof is low.

Also, it is recognized that according to the preparation process of the present invention, the average particle size and the particle size distribution of the filler-containing PTFE granular powder can be controlled by an addition amount of the nonionic surfactant.

Figure 4:
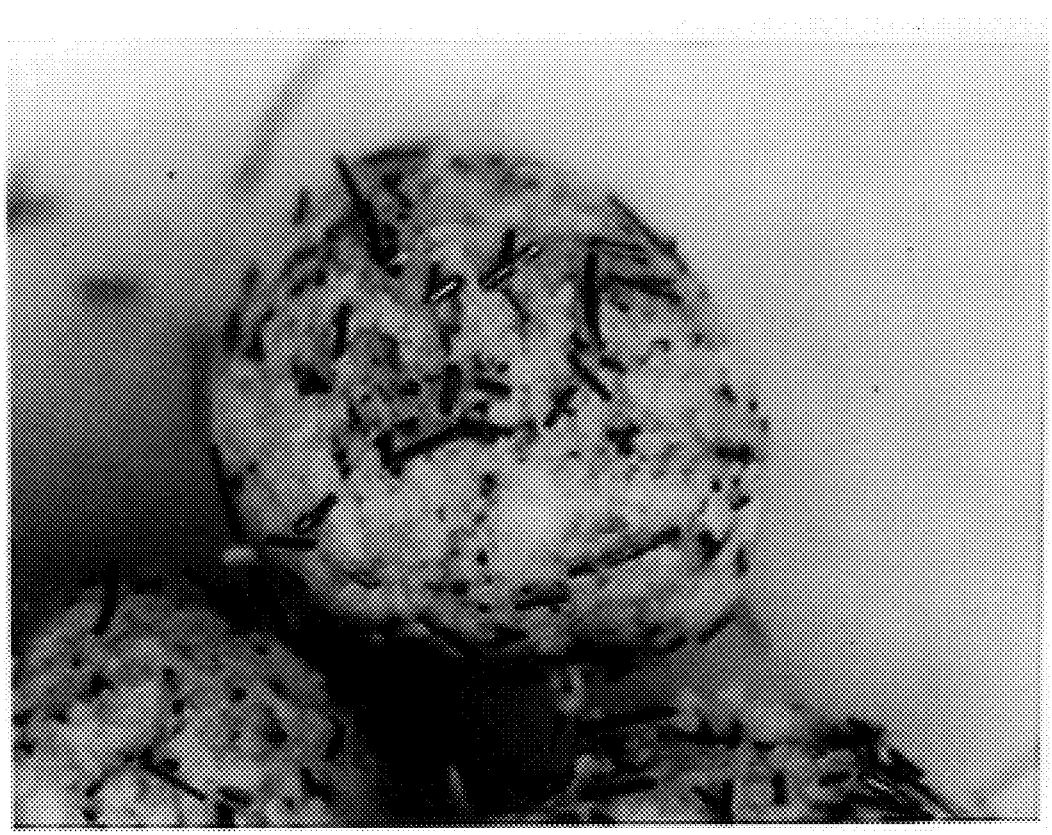
FIG. 4 is an optical microscopic photograph (magnification: x200) showing a structure of particles in the filler-containing PTFE granular powder of the present invention, which was obtained in Example 6.
Figure 5:
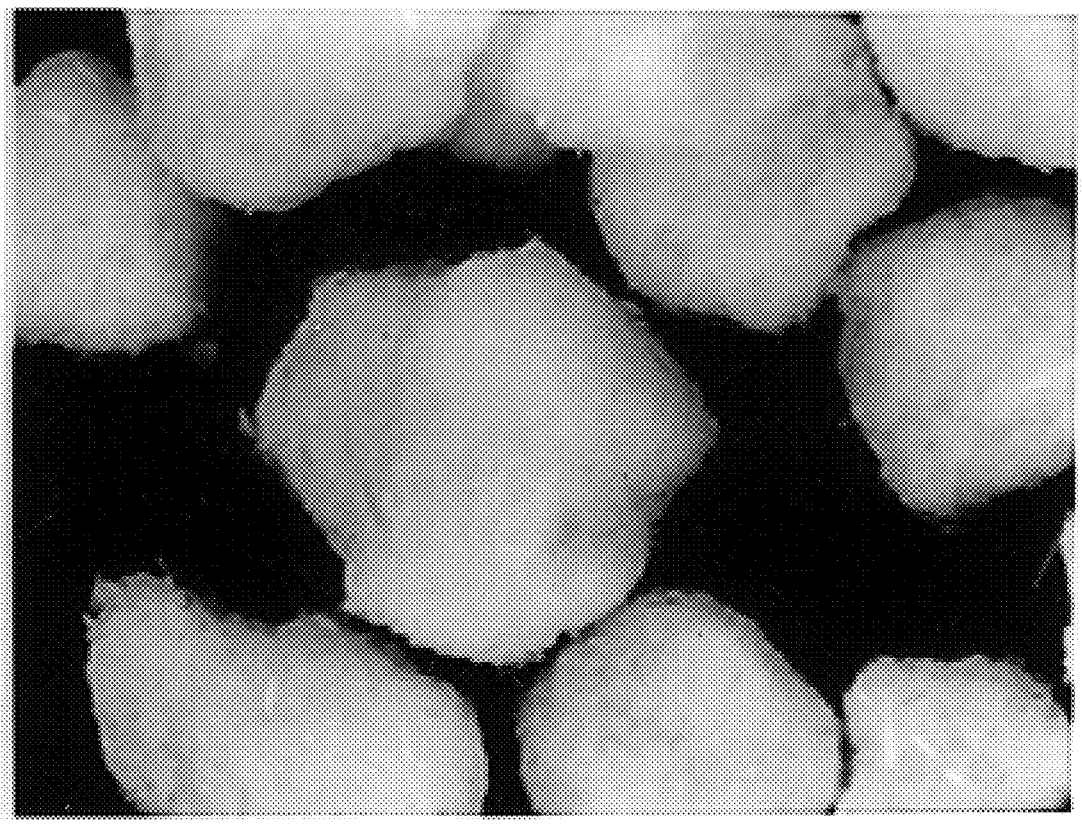
FIG. 5 is an optical microscopic photograph (magnification: x100) showing a structure of particles in the filler-containing PTFE granular powder, which was obtained in Comparative Example 1.
Figure 6:
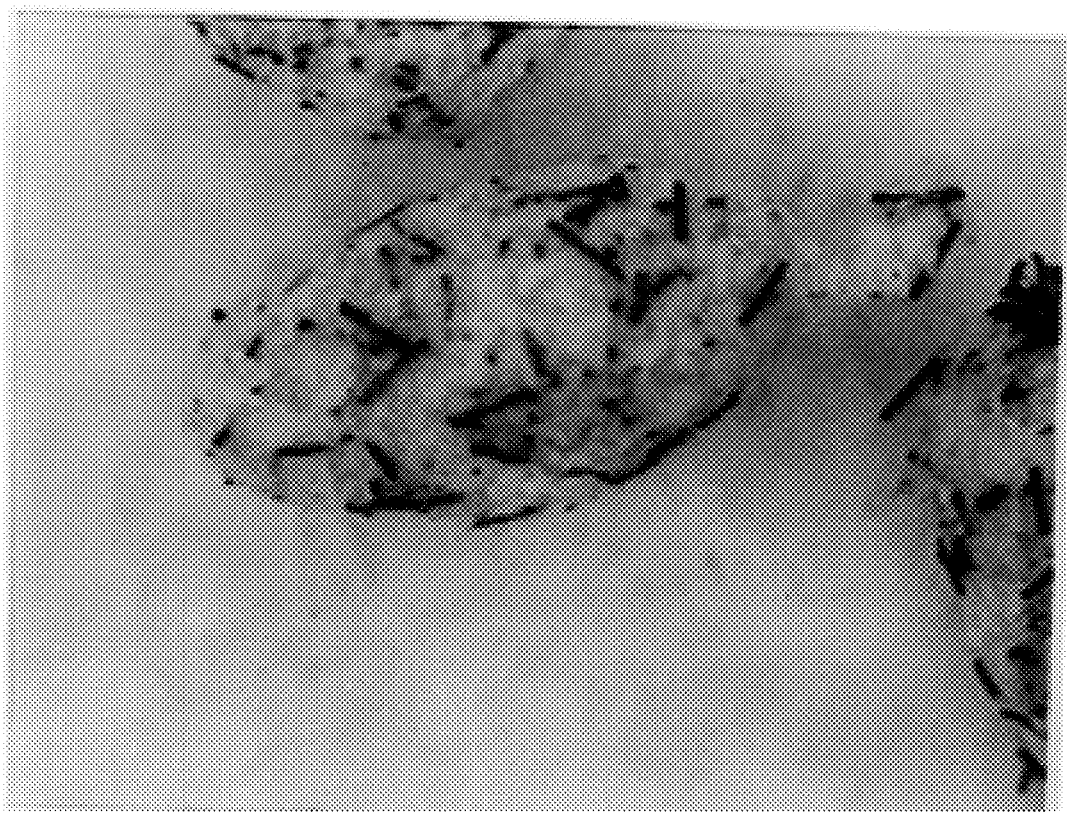
FIG. 6 is an optical microscopic photograph (magnification: x200) showing a structure of particles in the filler-containing PTFE granular powder, which was obtained in Comparative Example 2.

FIGS. 2 and 3 are optical microscopic photographs of Example 2 and FIG. 4 is an optical microscopic photograph of Example 6, which show the structure of the particle in the filler-containing PTFE granular powders of the present invention. FIGS. 5 and 6 are optical microscopic photographs which show the structure of the particle in the filler-containing PTFE granular powders obtained according to a conventional granulation process without using a surfactant.

As is evident from these Figures, though the particles in the filler-containing PTFE granular powder of the present invention are almost spherical, the particles in the filler-containing PTFE granular powder obtained according to the above-mentioned conventional granulation process is not spherical. Also, the particles in the filler-containing PTFE granular powder of the present invention are significantly smaller than the particles in the filler-containing PTFE granular powder obtained according to the above-mentioned conventional granulation process.

The reason why the filler-containing PTFE granular powder of the present invention is superior in powder flowability in spite of the small average particle size seems that, for example, the shape of the particles are almost spherical as mentioned above.

INDUSTRIAL APPLICABILITY

The filler-containing PTFE granular powder of the present invention which contains the almost spherical particles in its major portion has a large apparent density, a small average particle size and a sharp particle size distribution and is superior in powder flowability in spite of the small particle size. And, the molded product obtained from the granular powder is superior in tensile strength and elongation and has a low surface roughness.

Also, the preparation process of the present invention not only can provide the filler-containing PTFE granular powder having superior physical properties as mentioned above but also, particularly, can control the average particle size and particle size distribution by the amount of the nonionic surfactant, and can give the granular powder having a sharp particle size distribution.

What is claimed is:
1. A process for preparing a filler-containing polytetrafluoroethylene granular powder comprising:
    stirring a mixture of a polytetrafluoroethylene powder and a filler having a hydrophobic or water-repellant surface in water in the presence of a nonionic surfactant and an organic liquid which forms liquid-liquid interface with water, and
    granulating the mixture of polytetrafluoroethylene powder and filler;

said nonionic surfactant being present in the interface between the organic liquid and water.

2. The process of claim 1, wherein the nonionic surfactant is at least one member selected from the group consisting of polyoxyethylamine oxides, alkylamine oxides, polyoxyethylene alkyl ethers, polyoxyethylene alkyl phenyl ethers, polyoxyethylene fatty acid esters, sorbitan fatty acid esters, polyoxyethylene sorbitan fatty acid esters, glycerine esters, polyoxyethylene alkylamine, and derivatives thereof.

3. The process for preparing a filler-containing polytetrafluoroethylene granular powder of claim 1, wherein an amount of the nonionic surfactant is 0.01 to 5% by weight to a total amount of the polytetrafluoroethylene powder and filler.

4. The process for preparing a filler-containing polytetrafluoroethylene granular powder of claim 1, wherein the polytetrafluoroethylene is a modified polytetrafluoroethylene obtained by copolymerizing 99 to 99.999% by mole of tetrafluoroethylene and 1 to 0.001% by mole of a perfluorovinylether.

5. A filler-containing polytetrafluoroethylene granular powder made by the process according to claim 1 having an apparent density of the granular powder not lower than 0.6 g/cm$^3$.

6. The filler-containing polytetrafluoroethylene granular powder of claim 5, wherein the granular powder has a powder flowability of not less than 6 times under 21B method.

7. The filler-containing polytetrafluoroethylene granular powder of claim 5, wherein the granular powder has an angle of repose of not larger than 40 degrees.

8. The filler-containing polytetrafluoroethylene granular powder of claim 5, wherein the granular powder has an average particle size of not more than 500 μm.

9. A filler-containing polytetrafluoroethylene granular powder having an apparent density of not lower than 0.6 g/cm$^3$ and less than 0.9 g/cm$^3$, an angle of repose of not larger than 40 degrees and an average particle size of not more than 500 μm, wherein a proportion of the particles in the granular powder having a particle size of 0.7 to 1.3 times the average particle size is not less than 50% by weight on the basis of the totality of particles.

10. A filler-containing polytetrafluoroethylene granular powder having an apparent density of not lower than 0.9 g/cm$^3$ and less than 1.0 g/cm$^3$, an angle of repose of not larger than 38 degrees and an average particle size of not more than 500 μm, wherein a proportion of the particles in the granular powder having a particle size of 0.7 to 1.3 times the average particle size is not less than 50% by weight on the basis of the totality of particles.

11. A filler-containing polytetrafluoroethylene granular powder having an apparent density of not lower than 1.0 g/cm$^3$, an angle of repose of not larger than 36 degrees and an average particle size of not more than 500 μm, wherein a proportion of the particles in the granular powder having a particle size of 0.7 to 1.3 times the average particle size is not less than 50% by weight on the basis of the totality of particles.

12. The filler-containng polytetrafluoroethylene granular powder of claim 9, which comprises 2.5 to 50% by weight of the filler.

13. The filler-containing polytetrafluoroethylene granular powder of claim 9, which provides a molded article having a surface roughness of not larger than 3.0 μm.

14. The filler-containing polytetrafluoroethylene granular powder of claim 9, wherein the granular powder has a particle size distribution that the granular particles remaining on a 10 mesh sieve is 0% and granular particles remaining on a 20 mesh sieve is not larger than 5%.

15. The filler-containing polytetrafluoroethylene granular powder of claim 9, which comprises 2.5 to 50% by weight of the filler.

16. The filler-containing polytetrafluoroethylene granular powder of claim 11 which comprises 2.5 to 50% by weight of the filler.

17. The filler-containing polytetrafluoroethylene granular powder of claim 9, which provides a molded article having a surface roughness of not larger than 3.0 μm.

18. The filler-containing polytetrafluoroethylene granular powder of claim 10, which provides a molded article having a surface roughness of not larger than 3.0 μm.

19. The filler-containing polytetrafluoroethylene granular powder of claim 9, wherein the granular powder has a particle size distribution such that the granular particles remaining on a 10 mesh sieve is 0% and granular particles remaining on a 20 mesh sieve is not larger than 5%.

20. The filler-containing polytetrafluoroethylene granular powder of claim 10, wherein the granular powder has a particle size distribution such that the granular particles remaining on a 10 mesh sieve is 0% and granular particles remaining on a 20 mesh sieve is not larger than 5%.

* * * * *

UNITED STATES PATENT AND TRADEMARK OFFICE
CERTIFICATE OF CORRECTION

PATENT NO. : 6,197,862 B1
DATED : June 25, 2001
INVENTOR(S) : Asano et al.

It is certified that error appears in the above-identified patent and that said Letters Patent is hereby corrected as shown below:

<u>Column 16,</u>
Line 25, change "claim 9" to be -- claim 10 --
Line 31, change "claim 9" to be -- claim 11 --
Line 37, change "claim 9" to be -- claim 11 --

Signed and Sealed this

Tenth Day of September, 2002

Attest:

JAMES E. ROGAN
*Attesting Officer*     *Director of the United States Patent and Trademark Office*